United States Patent
Toussieh et al.

(10) Patent No.: US 12,420,525 B2
(45) Date of Patent: Sep. 23, 2025

(54) RE-MOLDABLE HOLSTER

(71) Applicant: 1791 OUTDOOR LIFESTYLE GROUP, LLC, Miami, FL (US)

(72) Inventors: Alejandro Toussieh, Mexico City (MX); Jesus Colin, Mexico City (MX); Ramiro Romani, Miami, FL (US)

(73) Assignee: 2ND AMENDMENT 1791 LLC, Miami, FL (US)

(*) Notice: Subject to any disclaimer, the term of this patent is extended or adjusted under 35 U.S.C. 154(b) by 968 days.

(21) Appl. No.: 16/746,917

(22) Filed: Jan. 19, 2020

(65) Prior Publication Data

US 2021/0221099 A1 Jul. 22, 2021

(51) Int. Cl.
| | |
|---|---|
| *F41C 33/02* | (2006.01) |
| *B29C 51/00* | (2006.01) |
| *B29C 51/14* | (2006.01) |
| *B29C 51/42* | (2006.01) |
| *B32B 5/02* | (2006.01) |
| *B32B 9/02* | (2006.01) |
| *B32B 9/04* | (2006.01) |
| *F42B 39/02* | (2006.01) |
| *B29K 623/00* | (2006.01) |
| *B29K 711/08* | (2006.01) |
| *B29L 22/00* | (2006.01) |
| *F41C 33/04* | (2006.01) |

(52) U.S. Cl.
CPC ............ *B32B 9/047* (2013.01); *B29C 51/004* (2013.01); *B29C 51/14* (2013.01); *B29C 51/421* (2013.01); *B32B 5/02* (2013.01); *B32B 9/025* (2013.01); *F41C 33/0209* (2013.01); *F42B 39/02* (2013.01); *B29K 2623/0683* (2013.01); *B29K 2711/08* (2013.01); *B29L 2022/00* (2013.01); *B32B 2262/0253* (2013.01); *F41C 33/041* (2013.01); *F41C 33/048* (2013.01)

(58) Field of Classification Search
CPC .... F41C 33/0209; F41C 33/048; F41C 33/02; B32B 9/047; B32B 9/025; B26C 51/004; B26C 51/14; B26C 51/421
See application file for complete search history.

(56) References Cited

U.S. PATENT DOCUMENTS

| | | |
|---|---|---|
| 3,902,639 A | 9/1975 | Rogers |
| 4,286,741 A | 9/1981 | Rogers |
| (Continued) | | |

OTHER PUBLICATIONS

PCT Search Report and Written Opinion for PCT/US2021/013814 (Mar. 31, 2021).

(Continued)

*Primary Examiner* — Corey N Skurdal
(74) *Attorney, Agent, or Firm* — Stetina Garred Brucker & Newboles

(57) ABSTRACT

A holster for a firearm is disclosed. The holster includes a first layer, a second layer and a third layer sandwiched between the first layer and the second layer. The first layer is made of a first material and defines an outer surface of the holster. The second layer is made of a second material and defines an inner surface of the holster. The third layer is made of a thermoplastic composite material with fibers embedded in a thermoplastic resin. A heating of the holster between a predetermined temperature range softens the third layer to facilitate a molding of the holster.

14 Claims, 3 Drawing Sheets

(56) References Cited

U.S. PATENT DOCUMENTS

| | | | |
|---|---|---|---|
| 4,340,437 | A | 7/1982 | Rogers |
| 4,759,482 | A * | 7/1988 | Olsen .................. F41C 33/0227 224/912 |
| 6,558,604 | B1 | 5/2003 | Beckman |
| 9,360,275 | B2 | 6/2016 | de Nijs |
| 2013/0193172 | A1 | 8/2013 | Damkot et al. |
| 2014/0075650 | A1 | 3/2014 | Garrison et al. |
| 2018/0072863 | A1 | 3/2018 | Scheffer et al. |
| 2018/0345575 | A1 | 12/2018 | Constantinou et al. |
| 2019/0127539 | A1 | 5/2019 | Dyksterhouse |

OTHER PUBLICATIONS

Forj Thermoplastic Ribbon, "Article Safety Information Sheet", May 30, 2018.
https://www.forj.com/pages/about (2020).
EP Search Report and Written Opinion for Application No. 21741568.6 (Jun. 27, 2023).
Cambell F C Ed—Campbell Flake C: "Manufacturing processes for advanced composites; Chapter 10 (Thermoplastic Composites: An Unfulfilled Promise)", Manufacturing Processes for Advanced Composites, Elsevier Advanced Technology, Oxford, GB, pp. 1-41; Jan. 1, 2004.
B. Tomas Astrom: "Thermoplastic composite manufacturing"; Composites, ASM International, pp. 570-578, US, Dec. 1, 2001.
First Office Action for China Application No. 202180006740.4 with machine translation; Jan. 10, 2024.
Second Office Action for China Application No. 202180006740.4 with machine translation; Sep. 24, 2024.
Grant Notification for China Application No. 202180006740.4 with machine translation; Mar. 4, 2025.
Office Action for Paraguay Application No. 2104161 with machine translation; May 6, 2024.
Second Office Action for Paraguay Application No. 2104161 with machine translation; Apr. 23, 2025.

* cited by examiner

RE-MOLDABLE HOLSTER

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to moldable articles. More particularly, the present disclosure relates to a moldable casing or covering, such as a holster for a firearm, and a method for manufacturing the same.

2. Related Art

The prevalence and popularity of carrying a firearm on one's person, and the manner of carry, has varied throughout the history of the United States. In the early 19th century when the country was primarily agrarian, open carry of firearms was relatively common while concealed carry was generally disfavored and/or legally prohibited. As the nation became more industrialized, and as large, urban population centers grew along with concerns of violent crime, increasingly restrictive laws governing many aspects of firearms, including the keeping and bearing thereof, were enacted. Thus, before the liberalization of state-level concealed carry laws in the 1970s, the carrying of firearms was largely relegated to law enforcement.

Although there were regional and agency-specific variations in the weapons issued to law enforcement officers, there were commonalities in type/action, caliber, capacity, barrel length, and overall size. For instance, the typical police service revolver was chambered in .38 Special or .357 Magnum with a four to five inch barrel, on a "middle" or "full-size" frame that were relatively consistent dimensionally across various manufacturers. More recently, issue firearms are semi-automatic pistols chambered in 9×19 mm that accept magazines with up to a fourteen to seventeen round capacity. Most law enforcement activity does not involve the active use of a firearm or other weapon, but one may become necessary at a moment's notice, so it must be immediately accessible on the person, that is, carried. This is typically achieved with a holster, or panels that is shaped to the dimensions of the firearm. Attachment clips, belt loops, shoulder rigs and the like then secured the holster to the wearer.

Because of the relative uniformity of duty weapons, there was likewise much uniformity in the configuration of the issued holster. Earlier variations were commonly pouches sized to enclose the entirety of the firearm and included a flap cover that was secured by a button or other mechanism. The need to draw the firearm as quickly as possible led to the development of holsters that kept the handgrip exposed, with a strap (as opposed to a flap cover) that could be disengaged to allow for such withdrawal without a significant compromise in retention. Subsequently, holsters that were fitted to the outer contour of the firearm were developed, where the close conformity of the holster body and the compressive forces exerted thereby against the firearm contained therein was used for retention. Typically, leather was the preferred material for its durability and comfort for the wearer. Demand for holsters custom-crafted to particular firearms thus increased, and while leather holsters must still be made individually, upscaling the manufacturing was possible because of the uniform design. Holsters manufactured from other materials besides leather such as polymers that are better suited for mass production have also been developed.

Recently, state legislatures across the country have been recognizing and respecting the Constitutional right to keep and bear arms for self defense and other lawful purposes for all. The specific permitting requirements vary across different states and jurisdictions, but the net effect has been the increase in the number of responsible individuals choosing to exercise their rights. Thus, although once limited to law enforcement, concealed carry is now available to most responsible private civilians. The needs of these individuals have created a challenge in the firearms market, especially in the necessary accoutrements for carrying firearms.

The choice in a firearm for carry is a deeply personal one, and multiple factors may be considered before selection of a particular one, even on a daily basis. The calculus may change based on situational and/or meteorological variables, as well as personal preference. For example, a larger firearm with a higher magazine capacity and/or better ballistics may be selected when the weather is colder and larger cover garments that more effectively conceal the firearm may be worn. On the other hand, a smaller firearm may be necessary when the weather is warmer, and less clothing is being worn. Different styles of carry, such as inside the waistband (IWB) may be required when wearing only a shirt, but outside the waistband (OWB) or shoulder carry may be possible when worn with a cover garment such as a jacket or sports coat that is not removed. The location on the body on which the holster is worn may also depend on the situation or even personal preference, such as appendix carry, opposite side/cross draw, small of back (six o'clock) carry, side (three o'clock/nine o'clock) carry, and so forth. Different retention mechanisms may be necessary depending on the anticipated activity level.

Conventionally, each of these separate styles of carry oftentimes require a separate holster optimized therefor. Within a single category holsters, there may be different cant angle configurations; for example, a holster configured for wear at the three o'clock/nine-o'clock position may not require a cant, whereas a holster configured for the four o'clock position may call for a moderate cant to position the grip at an ideal location as the user's arm is articulated into such position.

The foregoing merely illustrates a few examples of the variability of holster configurations. A holster is worn for a substantial duration every day, so comfort while maintaining concealment at an adequate level of retention is highly desirable. These design objectives are oftentimes mutually exclusive, and any given design is a compromise of one in favor of the other. The ideal balance may appear elusive, as the desired balance may not be fully appreciable by the wearer that likely changes over time in response to experience and training. For this reason, it is common for those carrying concealed firearms on a regular basis to constantly seek out and purchase new holsters that perhaps may meet their needs, if even for a short time.

Accordingly, there is a need in the art for a holster that can be reconfigured for a variety of carry situations and articles. There is also a need in the art for a holster that can be custom-molded by the user to fit a variety of different firearms or other articles specific to contemplated self-defense requirements. Furthermore, there is a need for holsters made of materials with optimal comfort while also retaining the article stowed therein.

BRIEF SUMMARY

One aspect of the present disclosure contemplates a holster. The holster may include a first layer, a second layer and a third layer sandwiched between the first layer and the second layer. The first layer may be made of a first material and define an outer surface of the holster. The second layer may be made of a second material and define an inner surface of the holster. Further, the third layer may be made of a thermoplastic composite material having a plurality of fibers embedded in a thermoplastic resin. Moreover, a heating of the holster between a predetermined temperature range may soften the third layer to facilitate a molding of the holster.

Another aspect of the present disclosure contemplates a method for molding a holster. The method may include heating a holster blank and maintaining the holster blank between a predetermined temperature range to soften the holster blank. The holster blank may include a first layer of a first material defining an outer surface of the holster, a second layer of a second material defining an inner surface of the holster, and a third layer sandwiched between the first layer and the second layer. The third layer may be made up of a thermoplastic composite material having a plurality of fibers embedded in a thermoplastic resin. Moreover, the heating of the holster between the predetermined temperature range may soften the third layer. The method further includes positioning a firearm inside the holster blank and applying a pressure on the holster blank so that the holster blank may be molded into a shape of the firearm. The method may also include hardening the holster blank by cooling the holster blank with the firearm disposed inside the holster blank. In one embodiment, the holster blank may be formed by adhesively attaching the first layer to the second layer.

According to another aspect, an article is disclosed. The article may include a first layer of a first material defining an outer surface of the article and a second layer of a second material defining an inner surface of the article. The article may also include a third layer sandwiched between the first layer and the second layer. The third layer may be made of a thermoplastic composite material having a plurality of fibers embedded in a thermoplastic resin. Moreover, a heating of the article between a predetermined temperature range may softens the third layer to facilitate a molding of the article.

The present disclosure contemplates additional specifics of the foregoing holster, the method for molding the holster, and the article In one embodiment, the plurality of fibers may be ultra-high molecular weight polyethylene fibers. In another embodiment, the first material is a leather material, while in another embodiment, the second material may be a leather material.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the presently preferred embodiments of a moldable holster and is not intended to represent the only form in which the presented embodiments may be developed or utilized. It is further understood that the use of relational terms such as first and second and the like are used solely to distinguish one from another entity without necessarily requiring or implying any actual such relationship or order between such entities.

Figure 1:
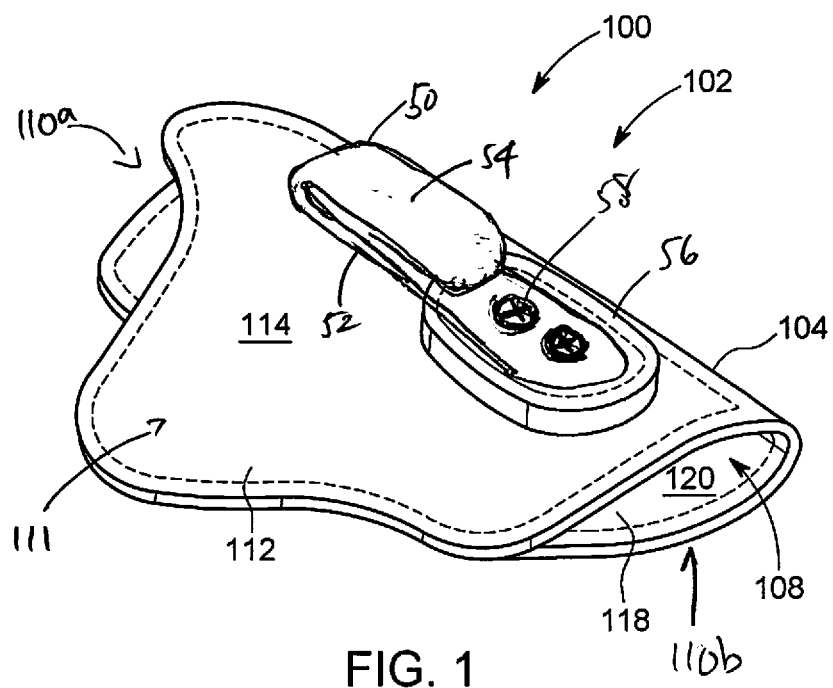
FIG. 1 illustrates a perspective view of an exemplary holster for holding a firearm, in accordance with an embodiment of the disclosure.

Referring to FIG. 1, an article 100 is shown, for example, a holster 102 suitable for housing or receiving a hand-held firearm, that is, a handgun (not shown), e.g., a self-loading pistol or a revolver. Although the article 100 is depicted as the holster 102, it will be appreciated that the article 100 constructed in accordance with the present disclosure can be a casing for handcuffs, a holster for less than lethal weapons such as electric shock devices, pepper spray cannisters, batons, and the like, as well as other tools of general application that a wearer of the article 100 may prefer to keep on the body and readily accessible, such as knives, flashlights, multi-tools, etc. Indeed, the article 100 may be adapted to hold any other object, and those having ordinary skill in the art will appreciate the interior shapes and dimensions of the article 100 necessary for so holding the object.

The holster 102 is adapted to facilitate an attachment of the firearm to a user. As shown, the holster 102 may include a housing 104 defining an interior cavity 108 for receiving at least a portion of the firearm. A handgun generally has a barrel, a trigger, a frame that houses the action/fire control components, and a grip by which the user holds the handgun. A self-loading pistol may further include an action slide that encloses the barrel and reciprocates along the longitudinal axis of the frame. In the illustrated example, the housing 104 is defined by a first opening 110a and an opposed second opening 110b.

In order to secure the firearm within the holster 102, the muzzle end of the barrel/slide is inserted through the first opening 110a, and toward the second opening 110b. The barrel may reach the second opening 110b and extend outwardly therefrom upon full insertion, but this is optional. The length of the housing 104 may correspond to the length of the barrel such that it does not extend beyond the second opening 110b. In other embodiments, the second opening 110b may be omitted, that is, the housing 104 may be closed at the muzzle end. This may be for purposes of preventing debris from entering the barrel, or to protect the crown of the barrel from damage, among other reasons. The first opening 110b is understood to be taller so as to accommodate the width and height of the barrel and/or slide, as well as the trigger guard that is to be partially enclosed within a trigger enclosure region 111. Embodiments in which almost the entirety of the firearm is exposed are possible, but the holster 102 is understood to cover at least the trigger and trigger guard to prevent accidental discharge while the firearm is holstered.

The holster 102 shown in FIG. 1 contemplates the attachment therefor to the wearer by way of a belt clip 50 that is generally characterized by a base claw 52 and a free claw 54. The claws 52, 54 are understood to be attached to a belt. In the illustrated example, the holster 102 is configured for inside-the-waistband use, that is, where the holster 102 is tucked into the inside of the pants of the wearer with the belt clip 50 being clipped to the belt over the waistband. The belt clip 50 may be constructed of a flexible/bendable metal that can extend a compressive force against the pants and belt. Alternatively, however, the belt clip 50 may be constructed of any suitable plastic or polymer material that exhibits similar characteristics.

The belt clip 50 may be attached to a platform 56 that serves as a spacer between the housing 104 and the base claw 52. As shown, the platform 56 has a raised pill-shaped configuration with securement hardware 58 that mounts the base claw 52 to the platform 56. In one embodiment, the securement hardware 58 may include screws or bolts that thread on to nuts incorporated into holes in the platform 56. Thus, the screws extend an adequate depth into the nut without extending into the interior cavity 108. The securement hardware 58 may also include various washers, grommets, and the like.

Again, the embodiment of the holster 102 shown in FIG. 1 is an inside-the-waistband style, though the present disclosure contemplates alternative embodiments for other styles of carry. For example, an outside-the-waistband holster may incorporate extension wings with belt loops that allow the passage of a belt. A separate paddle attachment may be mounted to the housing 104 as well. Those having ordinary skill in the art will recognize that the features of the presently disclosed holster 102 may be adapted to other holster styles, including shoulder holsters, drop-leg holsters, inside thigh holsters, ankle holsters, optic ready holsters, and so on.

As will be described in further detail below, the holsters 102 of the present disclosure contemplate the close fitting of the housing 104 to the firearm and retains the firearm within the interior cavity 108 with the compressive forces exerted by the housing 104. Generally, the holster 102 may be constructed of a material that facilitates in molding the same according to the shape and dimensions of the firearm. A secondary retention mechanism may be added to the holster 12, such as retention straps that are disengaged just prior to drawing the firearm. The one or more straps are adapted to move between an open position and a close position. In the open position, the straps allow a removal of the firearm from the housing 104, while the one or more straps may facilitate in securing the firearm within the housing 104. The straps, however, are optional and therefore may be omitted. Beyond straps, other retention systems that disengage with a thumb break and the like may be utilized, including those that require a third modality (level three retention) and beyond.

Figure 2:
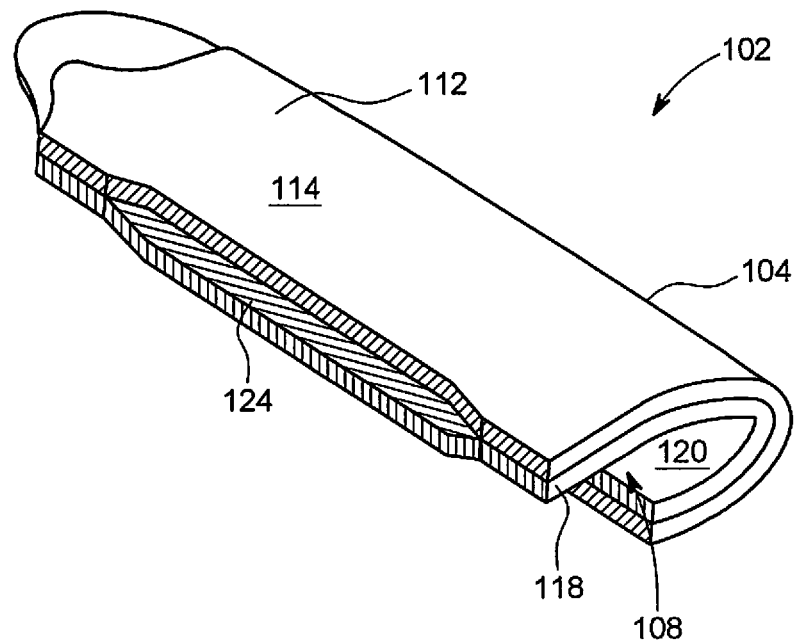
FIG. 2 illustrates a sectional view of the holster of FIG. 1, in accordance with an embodiment of the disclosure.

Referring to FIG. 1 and FIG. 2, the housing 104 (i.e. the holster 102) includes a first layer 112 of a first material defining an outer surface 114 of the housing 104, a second layer 118 of a second material defining an inner surface 120 of the housing 104, and a third layer 124 sandwiched between the first layer 112 and the second layer 118. In an embodiment, the first material and the second material are same and may be a leather material. The use of leather in the housing 104 is presented by way of example only and not of limitation, and any other flexible, fabric type material may be substituted without departing from the present disclosure. Examples of such alternative material include nylon fabrics (e.g., Cordura® from INVISTA). The outer surface 114 may include various color patterns such as camouflage and the like that enhance the visual appearance of the holster 102. Alternatively, the first material and the second material may be different materials. For example, the first layer 112 may be leather with a hard outer shell protected against wear as is typically encountered inside the pants of the wearer. However, the second layer 112 may be a softer suede type material that avoids damage to the firearm finish.

The third layer 124 includes a third material different from the first material and the second material. Preferably, the third material is a thermoplastic composite material including a plurality of fibers embedded into a material matrix. Preferably, the fibers are ultra-high molecular weight polyethylene (UHMWPE) fibers. The UHMWPE provides enhanced stiffness to the holster 102. In some embodiments, the fibers may be polyester fibers or Kevlar™ fibers. Also, the fibers are long fibers to enhance the stiffness of the holster 102. Further, the matrix is a thermoplastic resin and may include ethene homopolymer and 2-oxepanone homopolymer. The thermoplastic composite material is adapted to soften when heated between a predetermined temperature range. In some embodiments, the softening temperature may be as low as 140° Fahrenheit (F), with damage to the fibers occurring beyond 190° F. In a preferred embodiment, desirable molding and shaping of the housing 104 to the shape and dimensions of the firearm, and specifically the third layer 124 thereof, may be achieved while the temperature is maintained between 155° F. to 175° F. The thermoplastic composite has a melting temperature above the predetermined temperature range. As will be described in further detail below, any suitable heat source may be utilized to reach these temperatures, including warm water, hot air from ovens, blow dryers, heat guns, and the like.

In an embodiment, the thermoplastic composite is a FORJ™ thermoplastic ribbon material in which the ultra-high strength thermoplastic fiber is fully wetted with the thermoplastic polymer matrix, that is, complete bonding between the fiber and the matrix material. The combination is envisioned to provide the high strength of the fiber together with the low temperature formability of the matrix polymer. Once cooled, the thermoplastic composite is understood to retain its set shape. To the extent any adjustments to the final form, additions, or repurposing uses are anticipated, the material may be reheated, reshaped, and cooled to its rigid solid state.

A method of manufacturing the holster 102 will now be considered. At first, the first layer 112 is cut in appropriate shape and dimensions from a sheet of the first material, for example a leather sheet. The first layer 112 includes a first surface defining an outer surface 114 first hole of the holster 102 and a second surface 132 (shown in FIG. 3) disposed opposite to the first surface. Similar to the first layer 112, the second layer 118 is cut from a sheet of second material, for example, a leather sheet. The second layer 118 has same shape and dimensions as that of the first layer 112. Further, the second layer 118 includes a first surface defining the inner surface 120 of the holster 102 and a second surface 134 disposed opposite to the first surface.

The third layer 124 is cut from a sheet of third material, for example, the aforementioned sheet of thermoplastic composite material, in a shape similar to the first layer 112 and the second layer 118 but with smaller dimensions. In an example, the first layer 112, the second layer 118, and the third layer 124 may be cut by using a bench press or by a laser. The illustrated shape of the third layer 124 is by way of example only and not of limitation. It is contemplated that the third layer 124 provide the structural rigidity for retaining the firearm within the housing 104, and thus serves as a frame or backbone of the holster 102. The holster 102 is configured to accommodate a wide variety of handguns having the same general dimensions, but different outer contours and shapes. For example, there may be a variation for "large frame" handguns, another for "compact" handguns, another for "subcompact" handguns, and so forth. In this regard, the third layer 124 may be strategically placed at those locations within the housing 104 that contact the protruding portions of the handgun, e.g., the slide, the trigger guard, frame lower accessory rail, etc.

Figure 3:
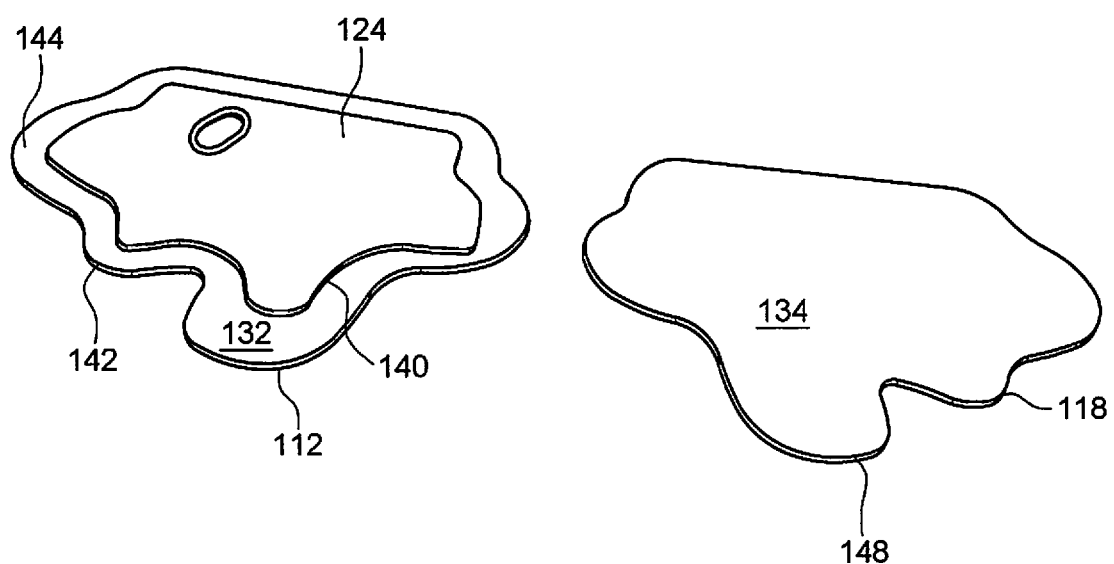
FIG. 3 illustrates a step of a method of manufacturing the holster of FIG. 1 in which the third layer is positioned over the first layer, in accordance with an embodiment of the disclosure.

Subsequently, the third layer 124 is positioned above the first layer 112 such that third layer 124 abuts the second surface 132 of the first layer 112. As shown in FIG. 3, the third layer 124 is disposed on the first layer 112 such that an edge 140 of the third layer 124 is offset from an edge 142 of the first layer 112. As shown, the edge 142 of the first layer 112 is disposed outwardly and at a distance from the edge 140 of the third layer 124. In this manner, an edge portion 144 of the first layer 112 is defined between the edge 140 and the edge 142. After positioning the third layer 124 on the first layer 112, adhesive may be applied on the edge portion 144. In an embodiment, the adhesive may be applied in the form of layer. The positioning of the third layer 124, like the shape itself, is presented by way of example only, and may be adjusted for improved retention of the firearm as described above in the context of the shaping of the third layer 124.

Figure 4:
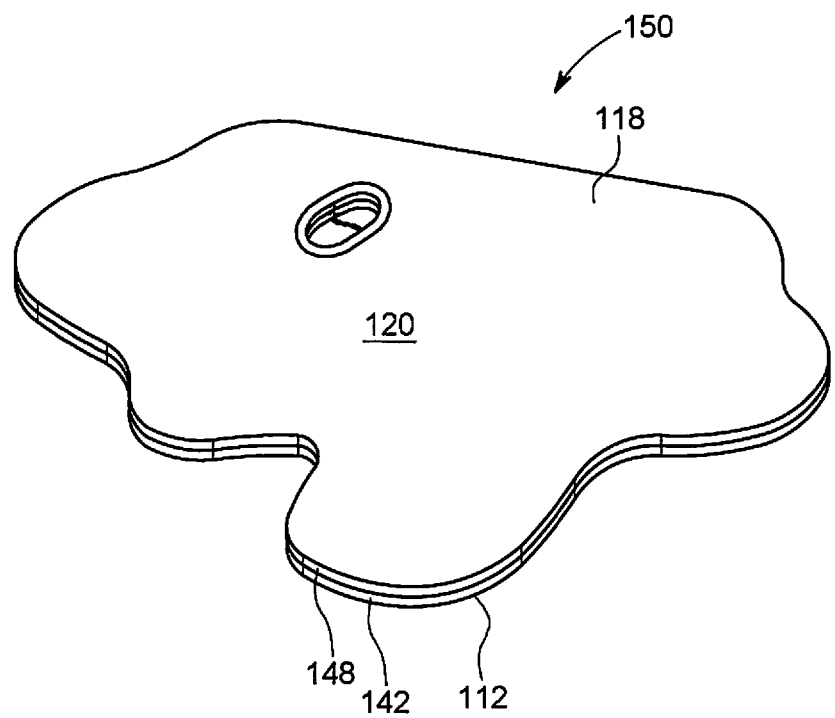
FIG. 4 illustrates a perspective view of a holster sheet utilized for manufacturing the holster, in accordance with an embodiment of the disclosure.

Thereafter, the second layer 118 is positioned on the third layer 124 and adhesively attached to the edge portion 144 of the first layer 112. In certain embodiment, the third layer 124 may also be adhesively attached to the first layer 112 and the second layer 118. The second layer 118 is positioned such that an edge 148 of the second layer 118 aligns with the edge 142 of the first layer 112 and the second surface 132 faces the second surface 134 of the second layer 118. In this manner, the edge 148 is offset from the edge 140 of the third layer 124 and the edge 148 is disposed outwardly of the edge 140 and at a distance from the edge 140. In an embodiment, the first layer 112 and the second layer 118 are stitched together using threads along the edge portion 144 to secure the first layer 112 with the second layer 118. In this manner, the first layer 112, the second layer 118, and the third layer 124 are attached to a form a holster sheet 150 (shown in FIG. 4).

Figure 5:
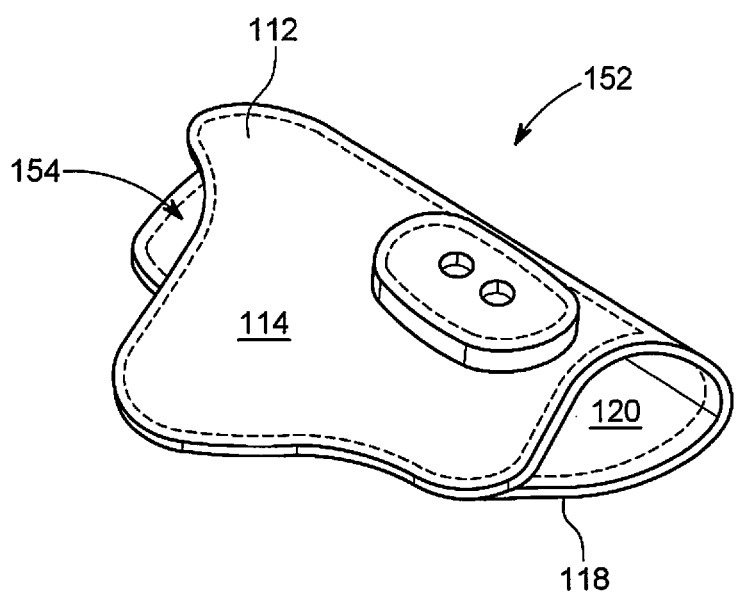
FIG. 5 illustrates a perspective view of a holster blank formed by folding the holster sheet of FIG. 4, in accordance with an embodiment of the disclosure.

After forming the holster sheet 150, the holster sheet 150 is folded and the second layer 118 is joined along the edge 148 to form a holster blank 152 (as shown in FIG. 5). The holster sheet 150 is folded and stitched or sewn together such that the first surface of the second layer 118 defines an elongated opening 154.

The holster blank 152 is molded to form the customized holster 102 according to the shape and dimensions of the firearm. The holster blank 152 is heated and a temperature of the holster blank 152 is maintained between the predetermined temperature range for a predetermined duration to facilitate a softening of the holster blank 152 (i.e. the third layer 124). In an example, for heating the holster blank 152, the holster blank 152 is placed inside a plastic bag and is sealed from all the sides. The plastic bag is placed inside hot water and heated to a temperature between the predetermined temperature range, for example, between 155° F. to 175° F. The temperature of the hot water may be restricted below 190° F. so as to prevent a degradation of the thermoplastic composite material disposed inside the holster blank 152. The holster blank 152 is kept inside the hot water for about 3 to 7 minutes depending on a thickness of the plastic bag to facilitate an adequate softening of the holster blank 152. Thereafter, the plastic bag may be removed from the hot water and the holster blank 152 is checked for adequate softening by pressing the holster blank 152. The holster blank 152 may be heated again if the holster blank 152 has not adequately softened.

After adequate softening of the holster blank 152, the heating of the holster blank 152 is stopped and the firearm is placed inside the elongated opening 154. Thereafter, the holster blank 152 is pressed around the firearm so that an inner surface of the holster blank 152 takes the shape of the firearm. The pressure exerted on the holster blank 152 results into molding of the holster blank 152 and the elongated opening 154 into the holster 102 and the cavity 108 respectively. In an embodiment, a manipulation tool may be used for applying the pressure on the holster blank 152. The thermosoftening plastic of the third layer 124 is understood to enable the molding of the otherwise rigid understructure of the holster 102. The leather or other fabric first layer 112 and second layer 118 need not be worked to fit the shape of the firearm.

The holster blank 152 is left to cool down with the firearm positioned inside the elongated opening 154 to an ambient temperature. Because of the cooling, the thermoplastic composite material of the third layer 124 is hardened and therefore, the holster blank 152 is molded into the holster as per the shape and dimensions of the firearm, and it is expressly contemplated that the end user of the holster 102 is able to perform the foregoing procedure to more specifically mold the holster blank 152 to the firearm. In this manner, a custom-fit holster 102 is manufactured or prepared without additional leatherworking or polymer (e.g., Kydex) working tools. Further, the holster 102 may be re-molded according to a shape of another firearm of similar size by heating the holster 102 and following the steps of molding of the holster 102 as explained above. The first layer 112 and the second layer 118 are flexible, as is the third layer 124 to a lesser extent. Nevertheless, the third layer 124 can be flexed to a sufficient extent to allow for the withdrawal of the firearm from the interior cavity 108.

The particulars shown herein are by way of example and for purposes of illustrative discussion of the embodiments of the disclosure only and are presented in the cause of providing what is believed to be the most useful and readily understood description of the principles and conceptual aspects. In this regard, no attempt is made to show details with more particularity than is necessary for the fundamental understanding of the present disclosure, the description taken with the drawings making apparent to those skilled in the art how the several forms of the present disclosure may be embodied in practice.

What is claimed is:

1. An end-user customizable holster for holding a firearm selected from a group of firearms each conforming to a predefined shape and size range, the holster comprising:
   a first layer of a first material defining an outer surface of the holster;
   a second layer of a second material defining an inner surface of the holster; and a third layer sandwiched between the first layer and the second layer, the third layer being a thermoplastic composite material having ultra-high strength thermoplastic fibers fully wetted within a thermoplastic polymer matrix resin, the third layer having dimensions different from the first and second layers and selectively shaped and positioned at select locations along the first and second layers in correspondence with generally protruding portions common to the group of firearms and not in other locations, an assembly of the first layer, the second layer, and a third layer being formed to define a holster blank generally compatible with the predefined shape and size range of the group of firearms, a heating of the holster blank between a predetermined temperature range achievable by the end user with a water bath to soften the third layer to facilitate molding of the holster blank around the firearm, a resultant structure conforming to the specific firearm and its holding orientation being maintained upon the holster blank being cooled to below the predetermined temperature range.

2. The holster of claim 1, wherein the first material is leather.

3. The holster of claim 1, wherein the second material is leather.

4. The holster of claim 1, wherein the predetermined temperature range is between 140 degrees Fahrenheit to 190 degrees Fahrenheit.

5. A method for molding a holster, the method comprising:
heating a holster blank and maintaining the holster blank between a predetermined temperature range to soften the holster blank, the holster blank includes:
a first layer of a first material defining an outer surface of the holster;
a second layer of a second material defining an inner surface of the holster; and
a third layer sandwiched between the first layer and the second layer, the third layer being a thermoplastic composite material having ultra-high strength thermoplastic fibers fully wetted within a thermoplastic polymer matrix resin, the third layer having dimensions different from the first and second layers and being selectively shaped and positioned at selected locations along the first and second layers in correspondence with generally protruding portions of a group of firearms each conforming to a predefined shape and size range and not in other locations, an assembly of the first layer, the second layer, and the third layer being formed to define the holster blank generally compatible with the predefined shape and size range of the group of firearms, the heating of the holster between the predetermined temperature range achievable by the end user with a water bath to soften the third layer;
positioning the firearm inside the holster blank and applying a pressure on the holster blank so that the holster blank is molded into a shape of the firearm at a specific holding orientation; and
hardening the holster blank by cooling the holster blank with the firearm disposed inside the holster blank.

6. The method of claim 5, wherein the predetermined temperature range is 140 degrees Fahrenheit to 190 degrees Fahrenheit.

7. The method of claim 5, wherein the first material is leather.

8. The method of claim 5, wherein the second material is leather.

9. The method of claim 5, wherein the holster blank is formed by adhesively attaching the first layer to the second layer.

10. An article for holding an object, comprising:
a first layer of a first material defining an outer surface of the article;
a second layer of a second material defining an inner surface of the article; and
a third layer sandwiched between the first layer and the second layer, wherein the third layer is a thermoplastic composite material having ultra-high strength thermoplastic fibers fully wetted within a thermoplastic polymer matrix resin and has dimensions different from the first layer and the second layer, a heating of the article between a predetermined temperature range achievable by the end user with a water bath to soften the third layer to facilitate a molding of the article around a shape of the object with the third layer being selectively positioned in correspondence with protruding portions of the object, a resultant structure corresponding to the shape of the object being maintained upon the article being cooled to below the predetermined temperature range.

11. The article of claim 10, the predetermined temperature range is 140 degrees Fahrenheit to 190 degrees Fahrenheit.

12. The article of claim 10, wherein the first material is leather.

13. The article of claim 10, wherein the second material is leather.

14. The article of claim 10, wherein the article is a holster for an ammunition magazine.

* * * * *